(No Model.) 3 Sheets—Sheet 1.
J. W. HARBIN.
CORN PLANTER.
No. 337,261. Patented Mar. 2, 1886.
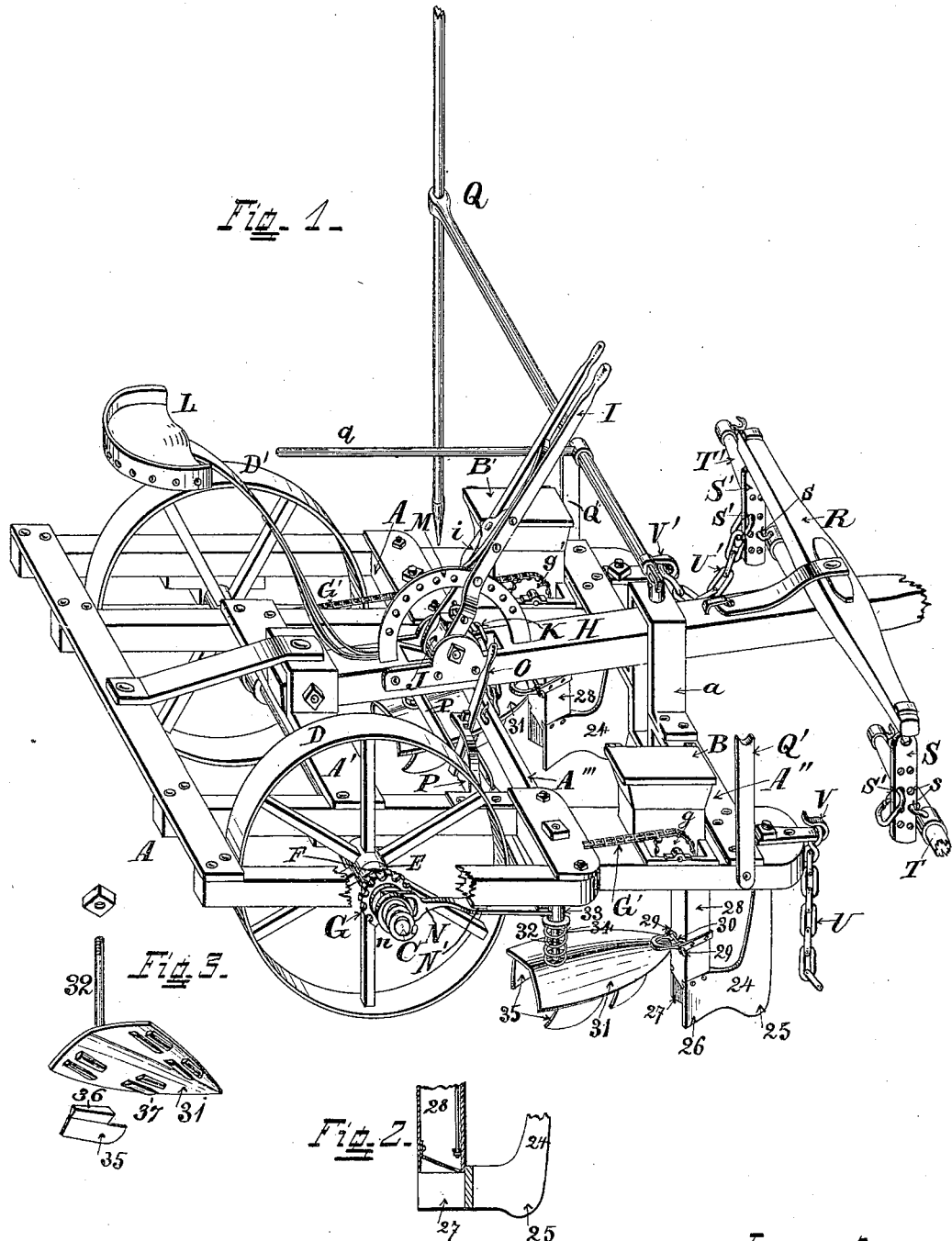
Attest
Carl Spengel
Geo. S. Wheelock
Inventor
James W. Harbin
by Knight Bros Atty's.

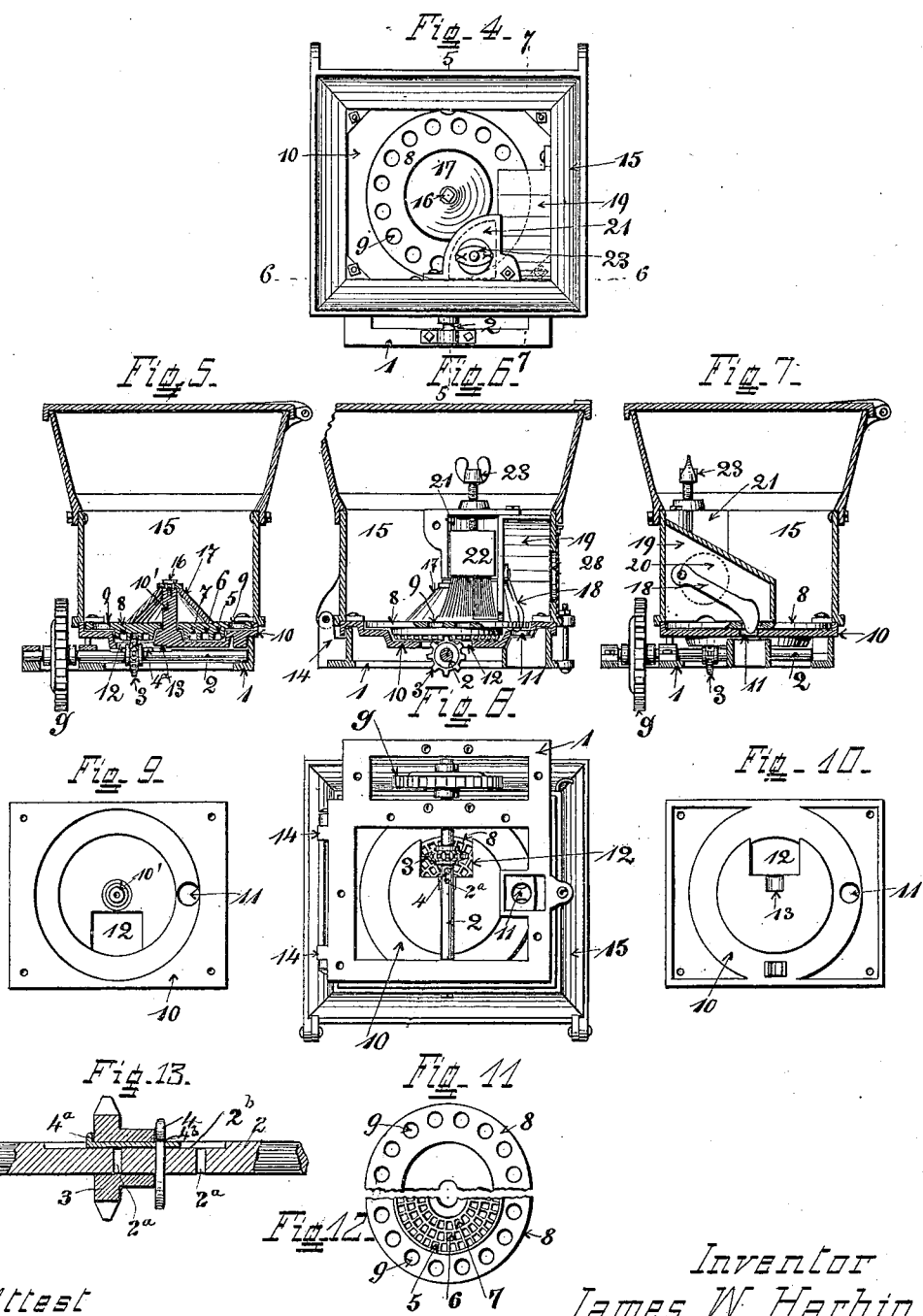

(No Model.)  3 Sheets—Sheet 3.
J. W. HARBIN.
CORN PLANTER.
No. 337,261.  Patented Mar. 2, 1886.
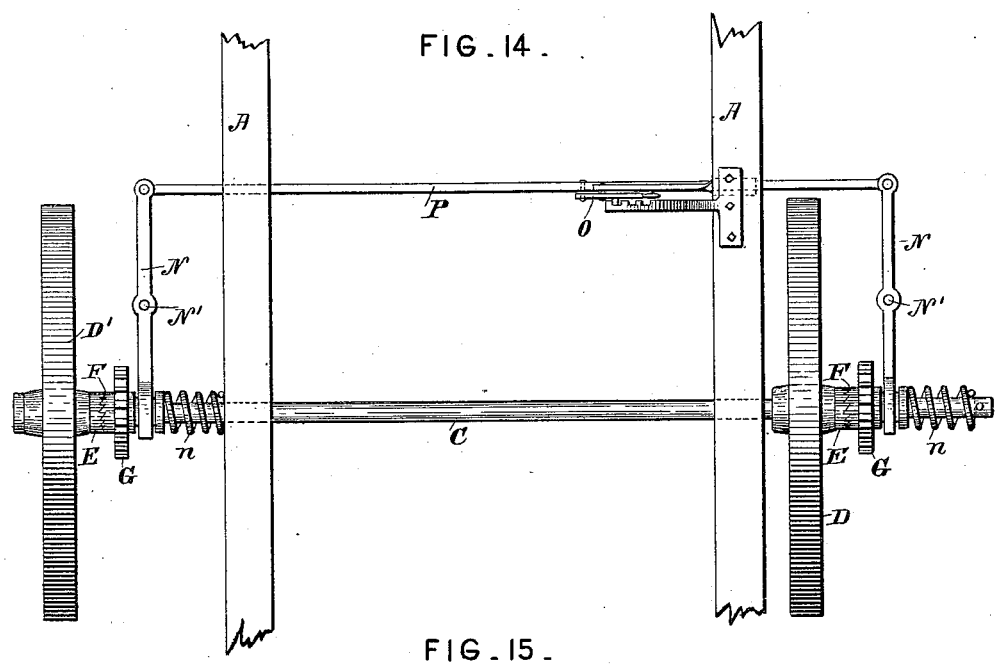
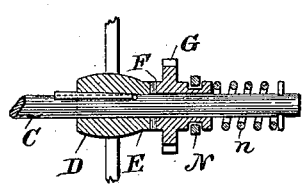
Attest:
Geo. T. Smallwood.
Walter Allen
Inventor:
James W. Harbin.
By Knight Bros.
Attys

UNITED STATES PATENT OFFICE.

JAMES W. HARBIN, OF VINCENNES, ASSIGNOR OF ONE-HALF TO LEON O. BAILEY, OF INDIANAPOLIS, INDIANA.

CORN-PLANTER.

SPECIFICATION forming part of Letters Patent No. 337,261, dated March 2, 1886.

Application filed August 21, 1885. Serial No. 174,957. (No model.)

*To all whom it may concern:*

Be it known that I, JAMES W. HARBIN, of Vincennes, Knox county, Indiana, have invented a new and useful Improvement in Corn-Planters, of which the following is a specification.

My invention relates to a device to be drawn over the ground by horse or other animal power and to plant Indian corn or other large seeds in drills under control of a person occupying a seat upon the machine.

In the accompanying drawings, Figure 1 is a perspective view of a corn-planter embodying my improvements. Fig. 2 is a partly sectioned elevation of the lower portions of the colter or clod-cutter and its attached seed-delivering spout. Fig. 3 represents the under side of my crown-shield and one of the covering-blades detached. Fig. 4 is a top view of one of the grain-receptacles. Figs. 5, 6, and 7 are vertical sections on the lines 5 5, 6 6, and 7 7, respectively, Fig. 4. Fig. 8 is an under side view of the grain holder and dropper. Figs. 9 and 10 are respectively a top and a bottom view of the intermediate plate. Figs. 11 and 12 are respectively an upper and under side view of one-half of the distributing-disk. Fig. 13 is a view showing the means for securing the pinion to the shaft on a larger scale. Fig. 14 is a plan view, and Fig. 15 a horizontal section, of the wheel-clutching device.

A may represent a suitable frame supporting two complete grain holding and dropping apparatus, B B', at the proper distance apart for rows, and somewhat in rear of said apparatus, resting upon axle C of a pair of ground-wheels, D D', of which one wheel, D, is fast to the axle, to which are also fast the two driving members E of clutches F, that project from sprockets G, that revolve and slide loosely on said axle, and which have chain-connection G' with similar sprockets, g g', of my dropping apparatus in a similar manner to that shown in the Patent No. 200,286, granted to myself and George W. Harbin, February 12, 1878. To a cross-bar, A', of the frame is hinged the butt-end of the tongue or pole H, which pole occupies a yoke, a, in cross-bar A'' at front of the frame. A lever, I, fulcrumed to the pole H, has a quarter-sheave, J, from which a chain or strap, K, extending to a cross-bar, A''', of the frame, enables the occupant of the seat L, by elevating the front end of the frame, to partially or wholly unearth the dropping mechanism, or, by a reverse action, to permit said mechanism to penetrate the ground to any desired depth. A spring-catch, $i$, on said lever, by engagement in either hole of segment-plate M, enables such adjustment to be made permanent until again changed by the person in charge. Both clutches are simultaneously engaged and disengaged by the simultaneous shift of the yokes N, that are operated by a single lever, O, and connecting-bar P. The yokes N are hinged to the frame at N'. Springs $n$ impart to the clutches a normal tendency to close whenever at liberty to do so.

Hinged to top of yoke $a$ on frame A is a marker, Q, of the represented T form, and which is made to rest in one or other crotch Q' Q'', according to whether the planted ground is for the time being on the right or left flank of the machine. A handle, $q$, enables said marker to be shifted from side to side by the driver without leaving his seat.

R is a double-tree that is pivoted to the tongue, and suspended from whose ends are clevises S S', to one or other hole of a series of holes, $s$, in which the single-trees T T' are engaged. Chains U U', occupying other holes of series of holes $s'$, connect the clevis with hooks V V' on the frame.

The two seed-distributers being of identical form one description will answer for both. 1 is a base-plate, which is screwed fast or bolted to the frame A. In this base-plate is journaled the shaft 2 of the dropper-sprocket $g$. The shaft 2 carries and drives a small wheel, 3, having pins or projections, and capable of longitudinal adjustment and of being set (by horizontal key $4^a$, having perforation $4^b$, and sliding on a seat, $2^b$, over holes $2^a$ in the shaft, and secured by pin or transverse key 4, occupying either one of the holes) to either one of three positions upon said shaft, so as to engage in either one of three circles of recesses, 5 6 7, on the under side of disk 8, which has a circle of orifices, 9, of which each is capable of receiving one grain of corn. The several concentric circles of recesses 5 6 7 have such relative radial distance as to secure with the same driving mechanism diverse distances of dropping—as, for example, nine, twelve, and fifteen inches apart. The disk 8 occupies and is supported by intermediate plate, 10, having central stud, 10', that occupies a hole in said disk, and having the orifice 11 (corresponding to the orifices 9) immediately over the spout. The plate 10 has also an opening, 12, and depression 13, to afford room for the play and adjustment, as aforesaid, of the pinion 3.

Secured by hinge 14 to base-plate 1 is my grain reservoir or hopper 15.

Secured by bolt 16 to top of disk 8 and centrally thereof is a conical boss, 17.

Pivoted to the reservoir in the manner shown in Figs. 5 and 6 is a gravitating pusher, 18, whose nose, penetrating each orifice 9 as it comes around, compels the descent of any grain whose dimensions might cause it to lodge in the orifice. This pusher is protected by an inclosing box or cover, 19, to whose interior access from without may be had by door 20.

Secured in the re-entrant angle formed by box 19 and the interior wall of the hopper, by means of quadrant-formed sheath, shield, or stay 21, is the correspondingly-formed cut-off brush 22, whose pressure upon the grain-distributing disk is regulated by thumb-screw 23.

Attached to and extending rigidly downward from front of frame A is my colter 24, having the convex and sharpened heel 25, and bifurcating at rear into two diverging wings, 26 27, which, in conjunction with the aforesaid colter proper, constitute a furrow-opener for the grain, which passes down into the opening thus made through a spout, 28, of triangular transverse section, similar to that described in my previous patent already referred to. Eyes 29 in rear of said spout receive a bolt, 30, which, traversing similar eyes in front of crown-shield or "turtle-back" 31, serves to uphold the front end of the latter. A vertical stud, 32, from rear part of said crown-shield, occupies a guide-socket, 33, that projects perpendicularly from the frame A. A spiral spring, 34, operates to press the rear of said crown-shield downward and to cause the covering-blades 35, that project from its under surface, to penetrate the ground, while at the same time allowing them to yield to rocks and other immovable and impenetrable obstacles. The blades 35 may either be bolted or riveted permanently to the crown-shield or may be formed with tapering dovetail shanks 36, which are inserted from the front rearward into corresponding sockets 37 on the under side of the crown-shield or said blades may be cast integrally to said shield.

I claim herein as new and of my invention—

1. In a corn-planter, the combination of a grain-delivery disk having concentric circles of recesses, and a sprocket-shaft having an adjustable wheel, 3, formed with pins or projections engaging in either circle of recesses in the disk, substantially as set forth.

2. The combination of a grain-delivery disk, a sprocket-shaft, 2, having holes $2^a$ and seat $2^b$, pinion 3, horizontal key $4^a$, having perforation $4^b$, and the transverse key 4, substantially as set forth.

3. The combination of the bed-plate 10, formed with a central stud, 10', and opening 12, the grain-delivery disk centered by the stud, sprocket-shaft 2, and pinion 3, adjustable on said shaft in said opening, substantially as set forth.

4. The resting or intermediate bed-plate, 10, having a central stud, 10', orifice 11, opening 12, and depression 13, substantially as set forth.

5. The combination of the resting or intermediate bed-plate, 10, having a central stud, 10', the delivery-disk, conical boss 17, and bolt 16, the boss being removable from the disk and stud, substantially as set forth.

6. The combination of a hopper having an opening in the side thereof, and a box or cover, 19, within the hopper in rear of the opening and forming a chamber, and a pusher-pawl hinged to the inner wall of the box or cover, substantially as set forth.

7. The combination, with a hopper, of a box or cover, 19, a quadrant-formed sheath, 21, and a cut-off brush corresponding in form to the sheath and supported by the box or cover, substantially as set forth.

8. The combination of the spout and crown-shield or turtle-back 31, having covering-blades and loosely connected to the spout, a frame, a rod supporting the crown-shield on the frame, and a spring surrounding the rod for holding the crown-shield down, substantially as set forth.

9. The crown-shield or turtle-back 31, having sockets 37, and covering-blades 35, having dovetail shanks 36, substantially as set forth.

10. The combination of the frame for supporting the grain holding and dropping apparatus, a tongue or pole hinged thereto and projecting over the front thereof, a segment-plate, M, secured to the tongue or pole, a lever, I, having sheave J and hinged to the tongue or pole, a catch on the lever engaging the segment-plate, and a chain, K, connecting the sheave to the frame, substantially as set forth.

11. The combination, with the frame and delivery-spout, of the colter 24, having the convex and sharpened heel 25, and the two diverging wings 26 27, substantially as set forth.

12. The combination, with the frame and delivery-spout, of the colter 24, having the convex and sharpened heel 25, and the two diverging wings 26 27, and the crown-shield 31, having covering-blades, a spring to press it down, and a loose connection with the spout, substantially as set forth.

13. The combination, with clutches on the outside of one wheel and the inside of the other wheel, respectively, of the clutch-yokes, a connecting-bar for the clutch-yokes, and a lever for shifting the bar, substantially as set forth.

14. The combination, with clutches on the outside of one wheel and the inside of the other wheel, respectively, of clutch-yokes N, pivoted to the frame, a bar, P, connecting the clutch-yokes, and an arm, O, for shifting the bar, substantially as set forth.

15. The combination of wheels D D', having clutches F F on the same side thereof, axle C, springs $n$ $n$, clutch-yokes N N, connecting-bar P, and lever O, substantially as set forth.

16. The T-formed double-acting reversible pointer hinged to a central support and having a rigid handle, $q$, substantially as set forth.

17. The combination, with the double-tree, of the drops or clevises S S', each drop or clevis having a double series of holes, $s$ $s'$, for adjusting the single-trees and draft-chains independently, substantially as set forth.

In testimony of which invention I do hereunto set my hand.

JAMES W. HARBIN.

Attest:
  JNO. C. F. GORDON,
  J. B. BRIDGES.